US007213168B2

United States Patent
Kalan et al.

(10) Patent No.: US 7,213,168 B2
(45) Date of Patent: May 1, 2007

(54) SAFETY CONTROLLER PROVIDING FOR EXECUTION OF STANDARD AND SAFETY CONTROL PROGRAMS

(75) Inventors: Michael Dean Kalan, Highland Heights, OH (US); Charles Martin Rischar, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 585 days.

(21) Appl. No.: 10/663,877

(22) Filed: Sep. 16, 2003

(65) Prior Publication Data

US 2005/0060606 A1   Mar. 17, 2005

(51) Int. Cl.
*G06F 11/00* (2006.01)
*G06F 11/16* (2006.01)

(52) U.S. Cl. ............... 714/11; 714/10; 714/31
(58) Field of Classification Search .......... 714/11, 714/12
See application file for complete search history.

(56) References Cited

U.S. PATENT DOCUMENTS

| 4,388,695 | A | * | 6/1983 | Heinemann | 711/163 |
| 5,361,366 | A | * | 11/1994 | Kawano et al. | 712/29 |
| 5,829,037 | A | * | 10/1998 | Sachs | 711/141 |
| 5,948,087 | A | * | 9/1999 | Khan et al. | 710/301 |
| 6,631,476 | B1 | | 10/2003 | Vandesteeg et al. | |
| 6,640,313 | B1 | * | 10/2003 | Quach | 714/10 |
| 6,694,450 | B1 | * | 2/2004 | Kidder et al. | 714/15 |
| 6,751,749 | B2 | * | 6/2004 | Hofstee et al. | 714/11 |
| 6,983,398 | B2 | * | 1/2006 | Prabhu | 714/12 |
| 7,096,380 | B2 | * | 8/2006 | Linger et al. | 714/11 |
| 7,146,530 | B2 | * | 12/2006 | Pomaranski et al. | 714/11 |
| 2003/0051053 | A1 | | 3/2003 | Vasko et al. | |
| 2003/0051203 | A1 | | 3/2003 | Vasko et al. | |
| 2003/0145120 | A1 | | 7/2003 | Vasko et al. | |
| 2003/0163642 | A1 | * | 8/2003 | Borkenhagen et al. | 711/121 |
| 2003/0208283 | A1 | | 11/2003 | Vasko et al. | |

FOREIGN PATENT DOCUMENTS

DE  36 33 953 A   4/1988
EP  0 621 521 A   3/2003

OTHER PUBLICATIONS

PCI Express System Architecture By MindShare, Inc , Ravi Budruk, Don Anderson, Tom Shanley Publisher: Addison Wesley Professional, Sep. 4, 2003 Print ISBN-10: 0-321-15630-7.*
Schiffer, Viktor et al "Introduction to DeviceNet Safety" WFCS-2000,Porto, Portugal, Sep. 6-8, 2000, 2000 IEEE ISBN 0-7803-6500-3.
Marszal, E. et al "High Reliability computing for control and safety" 2001 IEEE ISBN 0-7803-7191-7.

* cited by examiner

*Primary Examiner*—Scott Baderman
*Assistant Examiner*—Joseph Schell
(74) *Attorney, Agent, or Firm*—Keith M. Baxter; R. Scott Speroff (57) ABSTRACT

A safety controller may execute both standard and safety programs using shared architecture in which two processors symmetrically execute the safety program and check each other for errors, and one processor only executes the standard program to minimize undetected symmetrical corruption of the safety programs.

27 Claims, 5 Drawing Sheets

FIG. 12

SAFETY CONTROLLER PROVIDING FOR EXECUTION OF STANDARD AND SAFETY CONTROL PROGRAMS

CROSS-REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates to industrial controllers used for real-time control of industrial processes, and in particular to "high reliability" or "safety" industrial controllers appropriate for use in devices intended to protect human life and health.

Industrial controllers are special-purpose computers used in controlling industrial processes. Under the direction of a stored, controlled program, an industrial controller examines a series of inputs reflecting the status of the controlled process and changes a series of outputs controlling the industrial process. The inputs and outputs may be binary, that is, on or off, or analog, providing a value within a substantially continuous range. The inputs may be obtained from sensors attached to the controlled process, and the outputs may be signals to actuators on the controlled process.

"Safety systems" are systems intended to ensure the safety of humans working in the environment of an industrial process. Such systems may include the electronics associated with emergency-stop buttons, light curtains, and other machine lockouts. Traditionally, safety systems have been implemented by a set of redundant circuits separate from the industrial control system used to control the industrial process with which the safety system is associated. Such safety systems have been "hardwired" from switches and relays including specialized "safety relays" which provide comparison of redundant signals and internal checking of fault conditions such as welded or stuck contacts.

Hard-wired safety systems using duplicate wiring have proven cumbersome in practice because of the difficulty of installing and connecting hardwired components and duplicate sets of wiring, particularly in complex control applications, and in part because of the difficulty of troubleshooting and maintaining a hard-wired system whose logic can be changed only by re-wiring.

For this reason, there has been considerable interest in developing industrial controllers that may implement safety systems using a program simulating the operation of the physical components in hard-wired safety systems. Industrial controllers are not only easier to program but may provide reduced installation costs by eliminating long runs of redundant wiring in favor of a high speed serial communication network and by providing improved troubleshooting capabilities. U.S. Patent applications 60/373,592 filed Apr. 18, 2002; U.S. Ser. No. 10/034,387 filed Dec. 27, 2001; U.S. Ser. No. 09/667,145 filed Sep. 21, 2000; U.S. Ser. No. 09/666,438 filed Sep. 21, 2000; and U.S. Ser. No. 09/663,824 filed Sep. 18, 2000, assigned to the assignee of the present invention, describe the implementation of safety systems using industrial controller architectures, and are hereby incorporated by reference.

High reliability can be obtained in an industrial controller system by employing two industrial controllers which simultaneously execute the same control program and compare their operations to detect faults.

Often a safety application will be part of a more complex control process and it would be desirable to run, on common hardware, a safety program together with a standard control program, the latter addressing portions of the process where high reliability is not required. One obstacle to such a combination is the risk that the standard control program may corrupt the execution of the safety program, for example, by a misdirected reading or writing of the safety data or safety instructions such as may modify the safety program in unexpected ways.

SUMMARY OF THE INVENTION

The present invention provides a safety controller that may execute both standard programs and safety programs using shared hardware (in one embodiment using shared memory and processors) with reduced risk of corruption of the safety program by the standard program. This reduced risk of corruption is obtained by executing the safety program on two processors but executing the standard program on only one of these processors. Any corruption of the safety program by the standard program will be confined to a single processor and will thus be easily detected in a comparison of the execution of the two processors.

Specifically, the present invention provides a safety controller with a primary processing unit having a first processor communicating with a first memory holding both the safety program and a separate standard program. A partner processing unit having a second processor independent from the first processor communicates with a second memory independent from the first memory and holds the safety program and not the separate standard program. Synchronization programs executable by the primary and partner processing units execute the standard program in the primary processing unit and execute the safety programs in the primary and partner processing units and compare execution of the safety programs to enter a safety state when this execution differs.

Thus it is one object of the invention to provide an asymmetrical execution of safety and standard programs so that corruption of the safety program can be readily detected.

The first processor in the primary processing unit communicates with the first memory by a memory bus not directly accessible to the second processor in the partner processing unit but only accessible by the second processor through the first processor. In turn, the second processor of the partner processing unit communicates with the second memory by a memory bus not directly accessible to the first processor of the primary processing unit but only accessible by the first processor through the second processor.

Thus it is another object of the invention to provide a hardware barrier to corruption of the safety programs in the partner processing unit or corruption of the standard program in the primary processing unit by eliminating the possibility of direct access to the memories of the primary and partner processing units by the other.

The primary processing unit may be in a first housing and the partner processing unit may be in a second housing independent from the first housing. A communication bus may communicate between the first and second housings to allow intercommunication between the primary and partner processing units.

Thus, it is another object of the invention to provide an architecture that may be used for standard programs and easily upgraded for safety programs by the addition of a partner controller.

Alternatively, the primary and partner processing units may be in a single housing.

Thus, it is another object of the invention to provide an extremely compact controller that may execute both safety and standard programs.

The first memory may include at least a portion that is lockable by hardware against writing.

It is therefore another object of the invention to provide a hardware barrier to corruption of the safety program by the standard program in the primary processing unit.

The primary processing unit may include only a single processor.

Thus, it is another object of the invention to allow execution of the standard and safety programs in a multitasking environment.

Alternatively, the primary processing unit may include two processors, each having a memory.

It is thus another object of the invention to provide for yet further isolation between the standard program and the safety program in the primary controller by separating their execution on different hardware components.

The primary processing unit may include a transfer program for receiving program information from a user and for loading the safety information in the first memory and transmitting the safety program also to the second processor for loading in the second memory and loading the standard program information only in the first memory.

Thus, it is another object of the invention to allow safety programs and standard programs to be automatically segregated according to the asymmetric execution used in the present invention.

The first memory may also hold standard data used or generated by the standard program, and safety data used or generated by the safety program, where the second memory holds the safety data used and generated by the second program.

Thus, it is another object of the invention to provide protection against corruption not only to the program, but also to the data on which it operates.

The second memory may also hold a copy of some portions of the standard data.

Thus, it is another objection of the invention to allow the safety tasks to make use of some standard data where safety will not be compromised.

These particular objects and advantages may apply to only some embodiments falling within the claims and thus do not define the scope of the invention.

DETAILED DESCRIPTION OF THE PREFERRED EMBODIMENT

"High reliability" and "safety" systems are those that guard against the propagation of erroneous data or signals by detecting error or fault conditions and signaling their occurrence and/or entering into a predetermined fault state. High reliability systems may be distinguished from high availability systems which attempt to remain operating after some level of failure. The present invention may be useful in both systems, however, and therefore, as used herein, high reliability and safety should not be considered to exclude high availability systems that provide safety operation.

Figure 1:
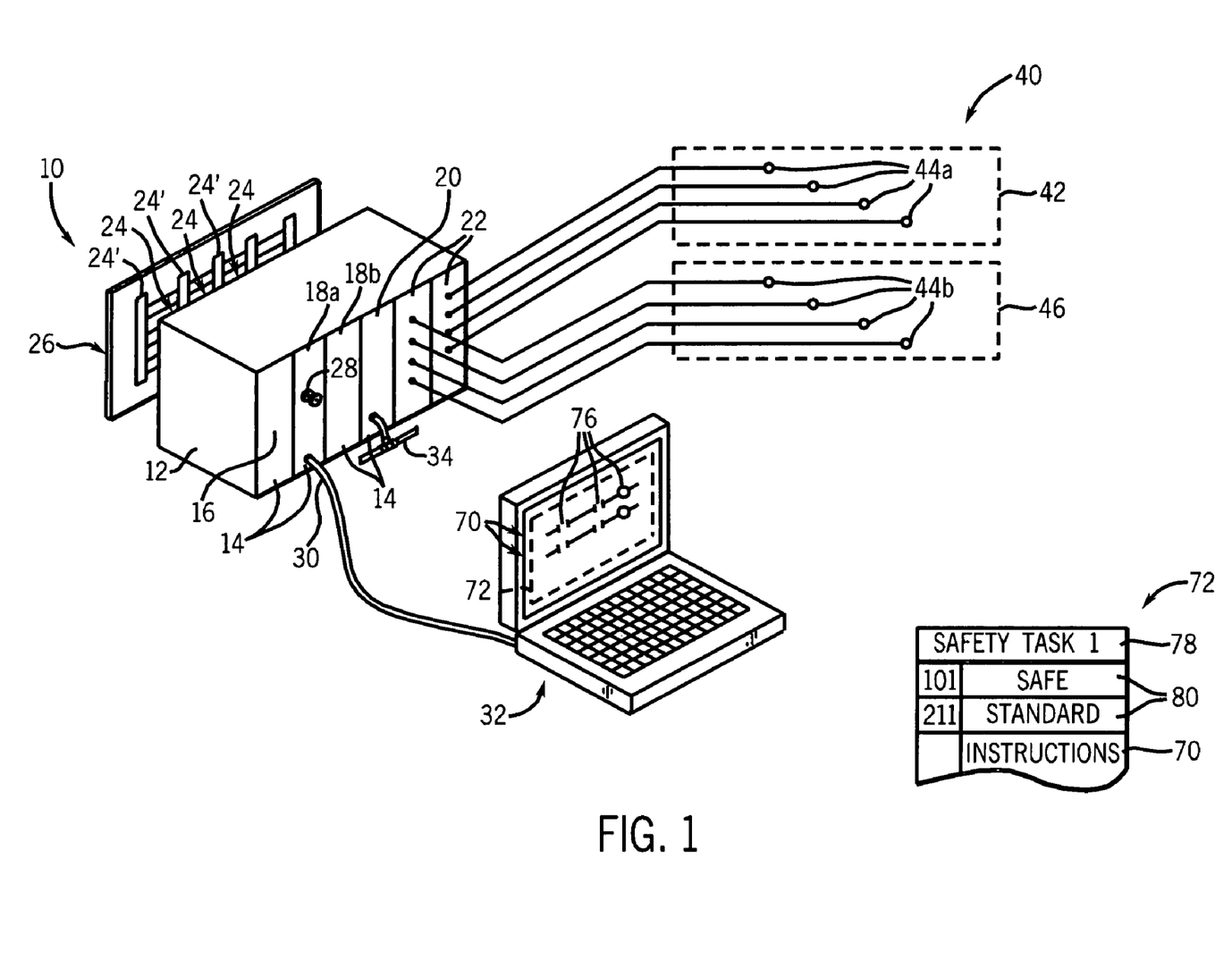
FIG. 1 is a simplified perspective view of a dual controller system suitable for use with the present invention including a primary and partner controller communicating on a backplane and a programming terminal communicating with the primary controller on a dedicated interface.

Referring to FIG. 1, a dual controller safety system 10 suitable for use with the present invention provides a chassis 12 into which a set of control modules 14 may be inserted according to the needs of the particular control application. Each of the modules 14 provides an electrical connector 24 at its rear (not shown) that may connect with a corresponding connector 24' on the front surface of a backplane 26 forming a rear wall of the chassis 12. The connectors 24' are joined by conductive traces so that modules 14 may be freely inserted into the chassis 12 to interconnect on the backplane 26 according to methods well known in the art.

The control modules 14 may generally include a power supply 16, a network module 20 and one or more input/output (I/O) modules 22, a primary controller 18a, and a partner controller 18b.

The power supply 16 may provide a source of regulated power over power conductors of the backplane 26 to the other modules 14 while the network module 20 provides a connection between communication conductors of the backplane 26 and a high speed serial network 34 such as an Ethernet or the like. The network 34 which may communicate with a remote chassis 12' (not shown) and other modules 14 including I/O modules 22 and other controllers 18. Both the backplane 26 and the network 34 (and interfaces thereto) may support a safety protocol such as that described in U.S. Patent application Ser. No. 60/373,592 referenced above.

The I/O modules 22 may communicate with various sensors and actuators 44a and 44b on a controlled process 40. The controlled process 40 may include standard processes 42 such as those of controlling factory equipment or the like, and safety processes 46 related to a safety applications where sensors and actuators 44a are those associated with the standard processes 42 and sensors and actuators 44b are associated with the safety processes 46. As will be described, the dual controller safety system 10 allows execution of both safety control and standard control programs sharing some of the same hardware.

The primary controller 18a and partner controller 18b each provide at least one independent processor and memory for executing a control program. Independent does not require that processor and memories be physically separated, however, that is preferred. In the preferred embodiment, the primary controller 18a and the secondary controller 18b are contained in separate housings, each independently attachable to the backplane 26. In this case, primary controller 18a includes a key switch 28 according to conventions known in the art that allows the primary controller 18a to be placed in a "run" or "programming" mode or other states that may be desirably controlled manually. The primary controller 18a also includes a serial communication port 30 such as an RS-232 port that allows it to communicate directly with a programming terminal 32. The programming terminal 32 may include standard programming tools modified for this application as will be described below.

The secondary controller does not include either the key switch 28 or the communications port 30 and may have other cost saving omissions.

Alternatively, the primary controller 18a and partner controller 18b may be placed in one housing provided the independence of the internal processing units to be described is maintained. The primary controller 18a and partner controller 18b may alternatively be in separate racks 12 connected by a high speed serial link.

Figure 2:
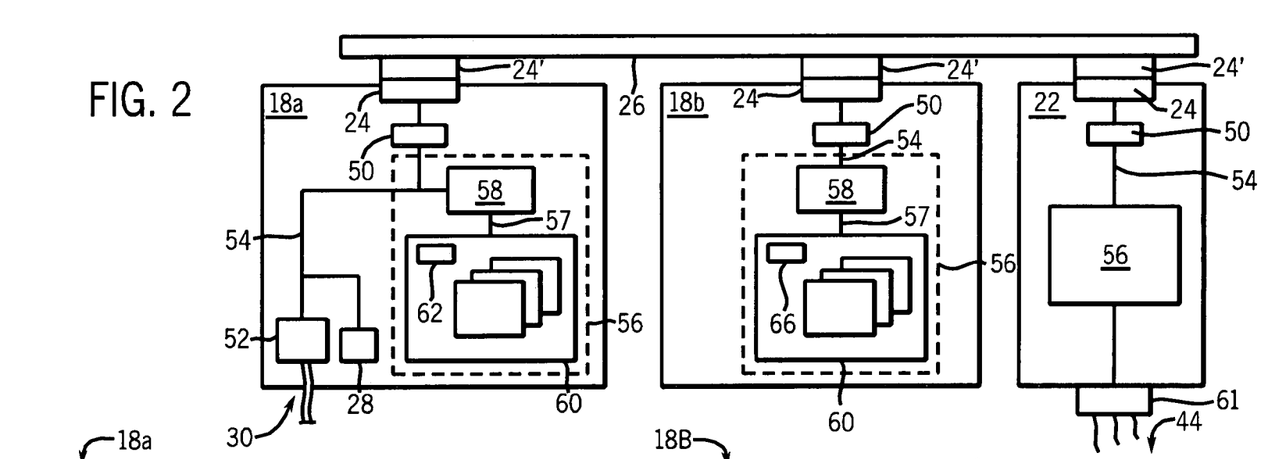
FIG. 2 is an electrical schematic representation of the primary and partner controllers of FIG. 1.

Referring now to FIG. 2, primary controller 18a may include an interface circuit 50 communicating via connector 24 with the backplane 26 and an interface circuit 52 communicating with the port 30, both connected by an internal bus 54 to a processing unit 56. Either interface circuits 50 or 52 may be used to receive programming information from the programming terminal 32 shown in FIG. 1 and interface circuit 50 may be used to communicate between primary controller 18a and partner controller 18b or any of the other modules for the communication of safety data, safety program information or other signals as will be described.

The internal bus 54 also connects with key switch 28 so that the key switch 28 (as well as each of the interface circuits 50 or 52) may be monitored by the processing unit 56.

The processing unit 56 includes a processor 58 and a memory 60, the processor 58 communicating directly with the memory 60 by means of a memory bus 57 separate from the internal bus 54 with the memory 60. Multiple processors may also be used. Memory may be a combination of volatile and non-volatile memory. In a multiprocessor system, each processor may have dedicated memory as well as shared memory. The memory 60 holds programs for an operating system and for a number of control tasks designated as either safety tasks or standard tasks. The operating system provides for the scheduling of tasks so that each task is executed in its entirety prior to the next task being invoked, however, other conventional operating systems may also be used. The memory 60 also holds I/O data received from and transmitted to the I/O modules 22. In addition, the memory 60 includes a fixed identification number 62 indicating that it is part of a primary controller 18a and suitable for execution of standard and safety tasks and for direct communication with a user and stored in non-volatile memory.

The partner controller 18b is similar to primary controller 18a but has a reduced part count eliminating interface circuit 52 and key switch 28, but providing an interface circuit 50, a processor 58, and a memory 60 all similar to those of primary controller 18a. An important exception is that partner controller 18b holds an identification number 66 in its memory indicating that it is a partner controller 18b incapable of operating alone or executing standard tasks. The memory 60 of the partner controller 18b also holds programs for an operating system and for a number of safety control tasks only. Together the programs held by the memories 60 of primary controller 18a and the partner controller 18b provide a number of system programs including a transfer and synchronization program as will be described below. As will be understood in the art, the division of the following program functions between the primary controller 18a and partner controller 18b or as between tasks and the operating system may be varied provided the described functions are maintained.

A typical I/O module 22 or network module 20 may include a first interface circuit 50 communicating over internal bus 54 with processing unit 56 and second interface circuitry 61 providing for I/O signals or communication signals as have been described.

Figure 3:
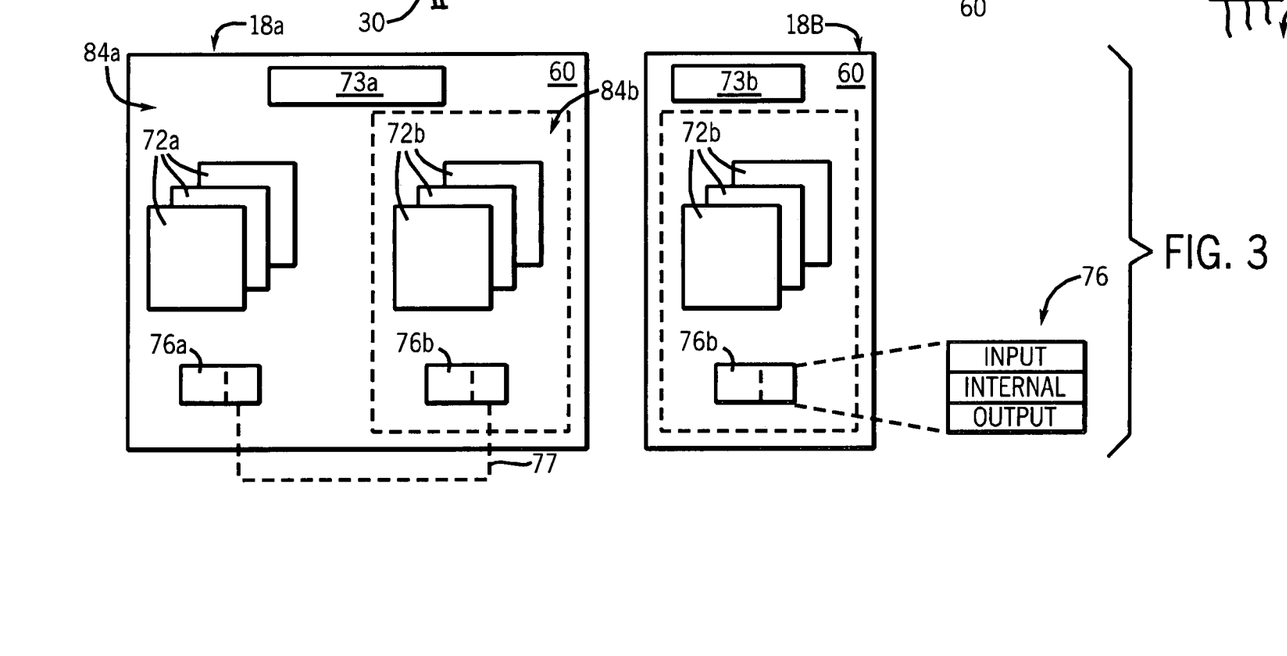
FIG. 3 is logical representation of the primary and secondary controllers of FIG. 2 showing the allocation of safety tasks and standard tasks.

Referring now to FIGS. 1 and 3, a user may operate the programming terminal 32 to enter a series of program instructions 70 here represented as rungs in a ladder logic program of a type well known in the art. The instructions may be grouped together into a task 72 representing a set of instructions that are logically executed together and which may be scheduled according to the operating system which implements multi-task scheduling methods as are generally understood in the art. Each of the instructions 70 includes variables 76 representing input and output values corresponding generally to the states of sensors and actuators 44a and 44b or internal program values. These variables 76 may have initial values that will be recorded with the task 72. The instructions may include "safety instructions" specific to safety applications that can only be executed within a safety task.

During the generation of the task 72, a programming tool on the programming terminal 32 will prompt the user to identify each of the variables 76 as a safety variable or a standard variable and the task 72 as either a safety task or a standard task. This status will be embedded in a file 73 holding the task 72 as a safety identifier 78 associated with the task and variable scoping identifiers 80 in the variable definitions portion of the file 73. Note that the present invention allows variables 76 within either a safety task 72 or standard task 72 to be designated either as standard variables 76 or a safety variable 76. A compiling program of standard design enforces this variable isolation such that standard tasks 72 may read but not write the safety variables 76 and safety tasks 72 may neither read nor write standard variables 76. Additional hardware and architectural support for this scoping is also provided as will be described below.

Referring now to FIG. 3, primary controller 18a will execute both standard tasks 72a associated with standard processes 42, and also safety tasks 72b associated with safety processes 46 using a single processing unit 56 operating in time division multiplex In this regard, the primary controller 18a will hold both standard data 76a and safety data 76b in the same physical memory 60 accessible by the processor 58 but in different regions 84 of the memory 60, one region 84a reserved for standard data 76a and one region 84b reserved for safety data 76b as will be described. In order to provide for hardware variable scoping, as will be described, certain of the standard variables 76a from region 84a may be also copied into the region 84b allocated for safety variables 76 as indicated by arrow 77.

The partner controller 18b contains only the safety tasks 72b and the safety data 76b in physical memory 60 including those copied values of the standard data 76a as has been described.

Figure 4:
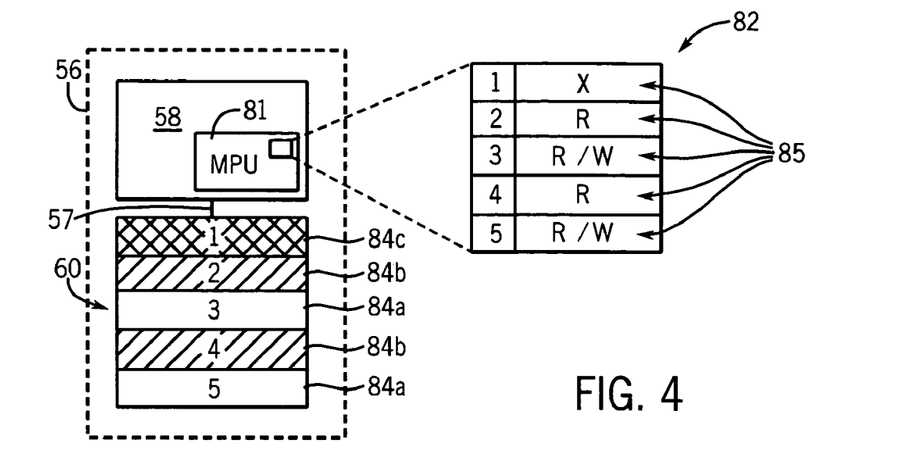
FIG. 4 is a representation of a processing unit suitable for the primary and partner controllers showing a processor with a memory protection unit and connected memory.

Referring now to FIG. 4, the processor 58 of both the primary controller 18a and partner controller 18b incorporates a memory protection unit (MPU) 81 of a type known in the art. The MPU (81) controls access by the processor 58 to memory 60 over the memory bus 57 through the use of hardware incorporated into the circuitry of the processor 58. Generally the MPU 81 employs an internal register 82 listing in entries 85 regions 84 of the memory 60 as may be flexibly defined and designating each region either as a read/write region (R/W) indicating that the region may be read or written to by the processor 58 or a read only region (R) designating that the data of this region may only be read by the processor 58 or unused indicated by an (X) indicating that this memory may be neither written to nor read from. Originally, all memory 60 is marked as a neither read nor write area indicated by (X). Access to the memory is controlled by hardware that physically prevents reading or writing according to the register settings.

Figure 5:
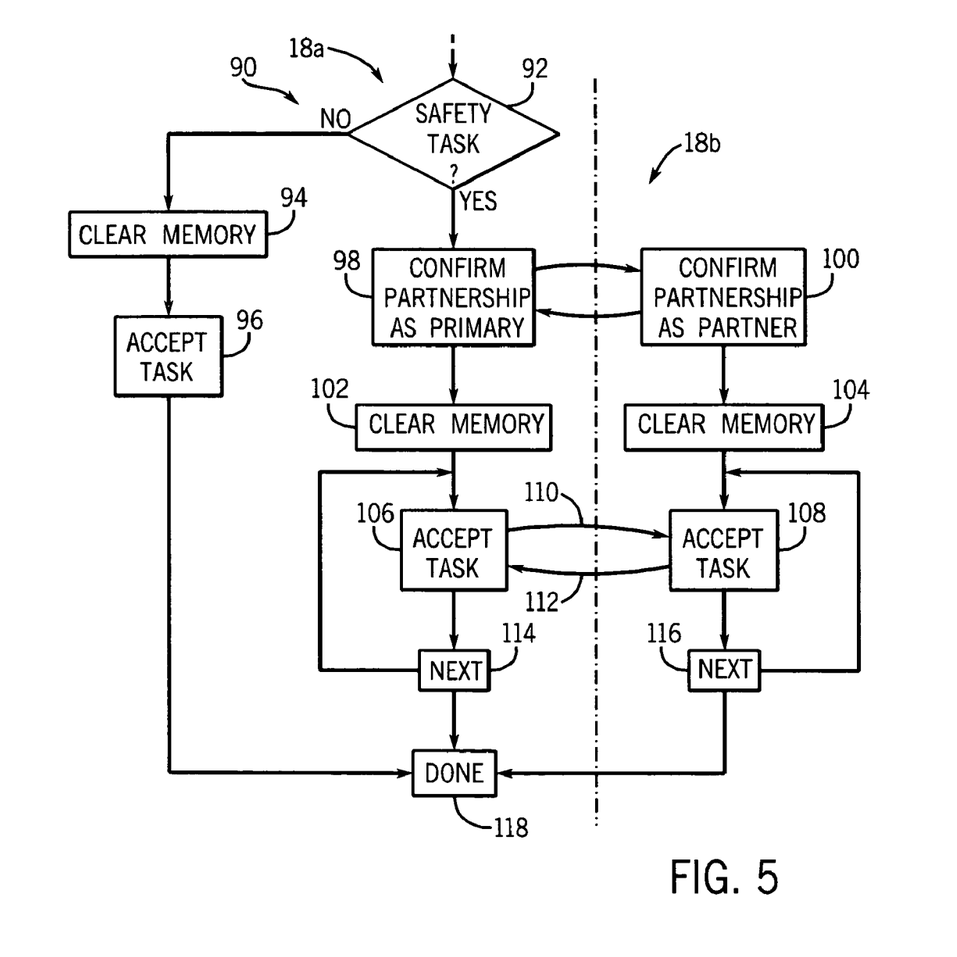
FIG. 5 is a flowchart of a transfer program executed in the primary controller for receiving programming instructions and data.

Referring now to FIG. 5 and FIG. 1, when a control program comprised of a number of tasks 72 is completed, it may be downloaded to the primary controller 18a only of the dual controller safety system 10 from the programming terminal 32 or another source by means of port 30 or network 34. The programming terminal 32 identifies the primary controller 18a by means of the identification number 62 contained in memory 60 of the primary controller 18a and opens a connection with that primary controller 18a. The primary controller 18a must be in the program mode as indicated by key switch 28 or from the programming terminal 32.

Figure 6:
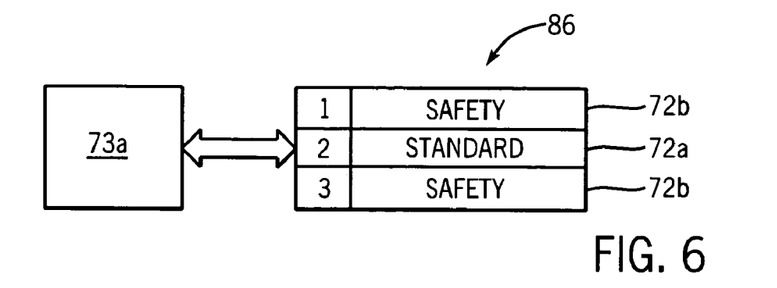
FIG. 6 is a functional diagram of an operating system used by the primary and partner controllers of FIG. 3 such as provides a task list for scheduling tasks for execution, the task list indicating whether the task is a safety or standard task.

Referring also to FIG. 6, at this time each task 72 is loaded into a task queue 86 used by the operating system 73a of the primary controller 18a to schedule each task 72 for execution using scheduling techniques well known in the art of multitasking operating systems. The task queue 86 indicates that the task 72 is a standard task or a safety task. A transfer program 90 in the primary controller 18a identifies each task 72 as a safety task or a standard task at decision block 92 based on the safety identifier 78.

The transfer program 90 in the primary controller 18a then receives each task 72 for downloading. If the task 72 is a standard task, then at process block 94, a region 84a of memory 60 in the primary controller 18a is cleared and at process block 96 the task is loaded into that region 84a. In the present invention, the regions 84a will be initially designated read or write in the register 82 for the MPU 81.

Referring again to FIG. 5, if at decision block 92, the task being received is a safety task, then at process block 98, the primary controller 18a attempts to confirm that there is a partner controller 18b by establishing a link between the primary controller 18a and the partner controller 18b by opening necessary connections on the backplane 26 or on the network 34 (for remote controllers 18) confirming that the partner controller 18b is working and has the necessary operating system 73b and is not otherwise linked to another primary controller 18a. The confirmation process of block 98 works with a corresponding process block 100 in the partner controller 18b.

If partnership is verified, each controller 18a and 18b records this relationship and partner controller 18b enters the safety task 72b in a task queue similar to that of task queue 86. Unlike the task queue 86, however, the task queue of the partner controller 18b will contain only safety tasks and the operating system 73b will schedule safety tasks only in response to the schedule followed by the operating system 73a. Generally, for real time control, each safety task 72b and standard task 72a is scheduled to be repeatedly executed at no less than a predetermined period to provide for suitable response time needed for control applications.

At succeeding process blocks 102 and 104 executed in the primary controller 18a and partner controller 18b, respectively, regions 84b in memory 60 in each of the primary controller 18a and partner controller 18b is cleared for the receipt of the safety task 72b. The regions 84b will be initially designated read only in the register 82 for the MPU 81 of the primary controller 18a and partner controller 18b.

At process block 106 and 108 executed in the primary controller 18a and partner controller 18b, respectively, the safety task 72b is accepted from the programming terminal 32 at the primary controller 18a and forwarded to the partner controller 18b as indicated by arrow 110 to be accepted by the partner controller 18b per process block 108 which replies with an acknowledgment signal 112 indicating that the task 72b has been properly received, being complete and correct. Generally, the safety task 72b is transmitted in portions and these process blocks 106 and 108 are repeated as indicated by the next loop of process block 114 for the primary controller 18a and 116 for the partner controller 18b until all portions are transmitted.

Once the safety task 72b has been fully received at the primary controller 18a and transmitted without error to the partner controller 18b, the transfer program is done as indicated by process block 118 and awaits possible loading of an additional task. Any errors in these blocks results in an error condition being reported to the user and the safety program being prevented from executing.

As a result of the transfer process, the tasks loaded into the primary controller 18a and secondary controller 18b are identical, and therefore if the user needs to upload the tasks, this may be accomplished with communication solely with the primary controller 18a as is done with a conventional controller. A similar procedure is used for program portions describing incremental on line editing of the tasks, that is, the user communicates with the primary controller 18a and the editing information is passed along to the secondary controller 18b by the primary controller 18a.

Figure 7:
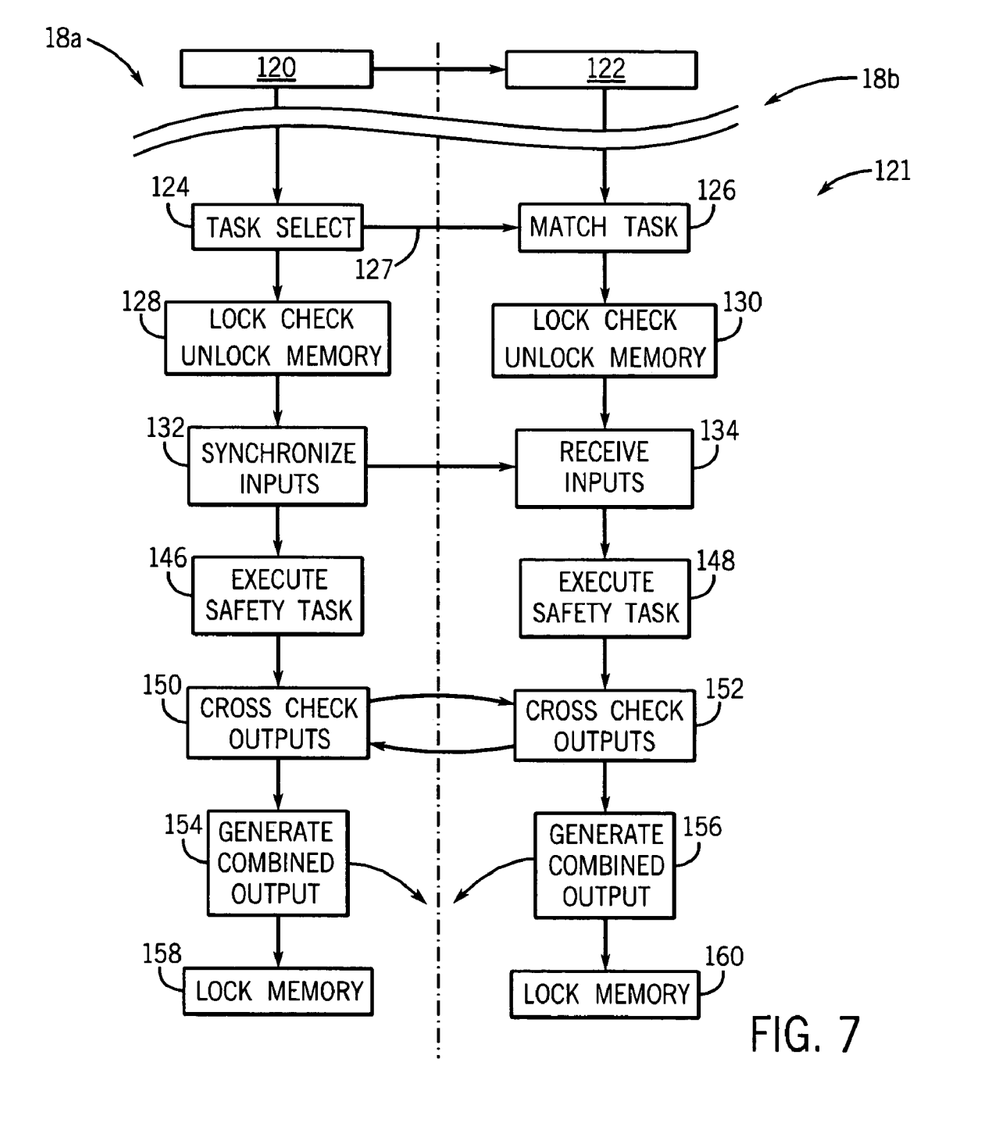
FIG. 7 is a flow chart showing execution of the safety task on the primary and partner controllers.

Referring now to FIG. 7, upon completion of the loading of the necessary standard tasks 72a and safety tasks 72b, the dual controller safety system 10 may be placed in a "run" mode, for example, through the use of key switch 28 shown in FIG. 1 which communicates this state to the partner controller 18b by a message over the backplane 26 whose transmission is indicated by process block 120 executed in primary controller 18a and whose reception is indicated by process block 122 executed in partner controller 18b.

At a first process block 124, executed by the operating system 73a of the primary controller 18a, the primary controller 18a schedules either a safety task 72b or standard task 72a for execution. Generally the operating system of 73b of partner controller 18b follows the scheduling by primary controller 18a and needs to provide fewer functions than the operating system 73a.

Assuming a safety task 72b is selected per task select block 124, the operating system 73a begins a synchronization program 121 starting with the forwarding of a message 127 to the operating system 73b of partner controller 18b indicating that a safety task 72b is about to be executed so that the operating system 73b can find that task 72b in its task queue 86 as indicated by process block 126.

The operating system 73a and 73b then proceed to succeeding process blocks 128 and 130, respectively, where the registers 82 of the MPUs 81 for the memory region 84b holding the tasks 72b and its variables 76 are checked to ensure that these regions 84b are correctly in read only mode. If the regions 84b of the memories 60 are not in the read only mode, this indicates a problem with the previous locking of the memory upon conclusion of a safety task and an error is generated and further execution is suspended until the user corrects the problem.

If the lock check of process blocks 128 and 130 indicates that the regions 84b were locked (e.g., in read only status), then the regions 84b are unlocked (e.g., moved to read/write status) and operating systems 73a and 73b proceed to process blocks 132 and 134, respectively. This unlocking step could alternatively be performed by the safety task itself as a first step so long as task execution is not interrupted by the operating system.

At these process blocks, the inputs for the safety tasks 72b representing input values of the safety variables 76 are synchronized for each of the primary controllers 18a and partner controller 18b.

Figures 8, 9, 10, 11:
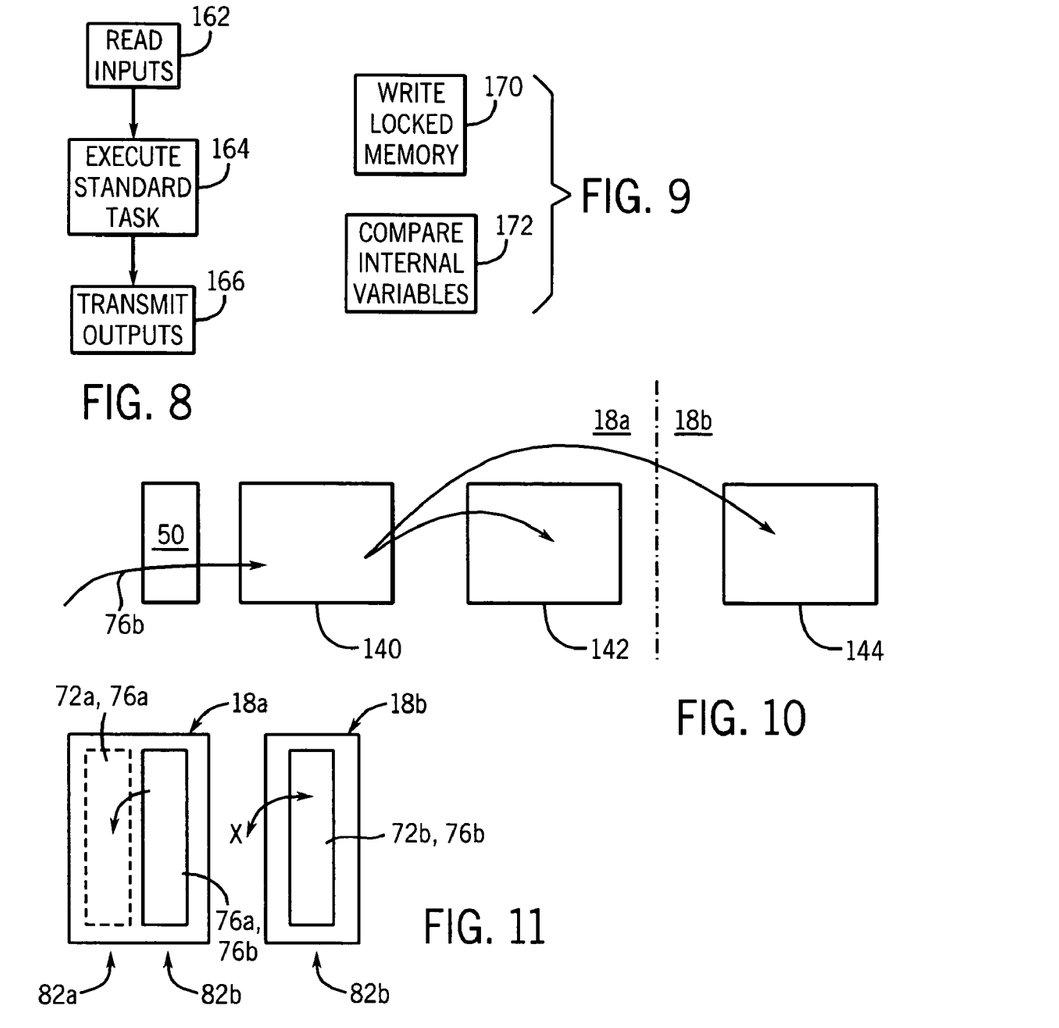
FIG. 8 is a flowchart similar to that at FIG. 7 showing execution of a standard task on the primary and partner controllers.
FIG. 9 is a representation of two regularly scheduled tasks for checking the memory lock and comparing variables between the primary and partner controllers.
FIG. 10 is data flow chart showing the synchronization of input data per one step of FIG. 7 using a two-stage buffer to ensure uniformity of asynchronous input values.
FIG. 11 is a simplified view of FIG. 3 showing the effect of asymmetrical loading of standard and safety program information in preventing corruption of standard program information by the safety program.

Referring momentarily to FIG. 10, generally input values 76b are received solely by primary controller 18a asynchronously through interface circuit 50 to be held in asynchronous buffer 140 formed as part of memory 60. This buffer 140 may fill up in an ordered manner according to a scan conducted asynchronously with task scheduling by the operating system 73a or may fill up on a random basis according to changes in input variables 76 that trigger a communication of messages to the primary controller 18a. In the present invention, it is necessary that the input variables 76 exist as identical copies in the memories 60 of the primary controller 18a and partner controller 18b. This synchronization is accomplished by an ordered read out of buffer 140 simultaneously into clean buffers 142 and 144 in primary controllers 18a and partner controller 18b, respectively, during process blocks 132 and 134. In this process, all input data flows from the primary controller 18a to the partner controller 18b so as to eliminate any possibility that different input variables 76 would be in the controllers 18a and 18b as might occur if input variables 76 were communicated directly to each of the primary controller 18a and partner controller 18b separately.

This same procedure allows "forcing" of inputs to be synchronized between the primary controller 18a and the secondary controller 18b. The primary controller 18a places the forced inputs into the buffer 140 with a tag to prevent them from being overwritten, and the forced input is naturally conveyed to the secondary controller 18b.

Referring again to FIG. 7, upon completion of the synchronization of inputs, as indicated by process blocks 146 and 148, the operating systems 73a and 73b execute the safety tasks 72b independently in the primary controller 18a and partner controller 18b, respectively, without further synchronization. This provides for extremely rapid execution of the safety tasks 72a without undue communication delays.

At succeeding process blocks 150 and 152, in the primary controller 18a and partner controller 18b, respectively, primary controller 18a sends its output variables to partner controller 18b and partner controller 18b sends its output variables to primary controller 18a in a cross-checking process. Each of the primary controller 18a and partner controller 18b then compares its own output values to those computed by the other controller. If there is an error, a safety state is entered, otherwise each primary controller 18a and partner controller 18b proceeds to respective process blocks 154 and 156 where they generate a combined output value set for transmission over the network 134 or backplane 26 according to a high reliability protocol. The safety state, as is understood in the art, invokes a set of predefined output values and ceases operation of the control process notifying the operator of an error.

In the present invention, a series of combined data words are generated containing a convenient block of output values computed by primary controller 18a and a complement of the same output values computed by partner controller 18b.

After completion of the generation of the output word described by process blocks 154 and 156, the safety task 72b is complete and the operating system locks the region 84b of memory 60 back to read only mode as indicated by process blocks 158 and 160 and proceeds to the next task as scheduled. Alternatively, the locking could be performed by the finals step of the safety task itself, so long as task execution is not interrupted by the operating system.

Referring to FIGS. 6 and 8, if at process block 124 of FIG. 7, the task select block selects a standard task 72a, then the operating system 73a simply begins execution of that task on primary controller 18a by reading of the input variables 76 as indicated by process block 162. Execution of the standard task indicated by process block 164 and transmission of output values as indicated by process block 166. Each of these steps is well understood in the art. The partner controller 18b does not execute the standard task but waits for another safety task. The transmission of outputs needs not observe the safety protocol as described.

Referring now to FIG. 9, the operating system 73a and 73b of primary controller 18a and partner controller 18b may periodically execute two additional standard tasks, for example, once every few hours. The first task indicated by process block 170 is a standard task that attempts to write data from each safety task identified by task queue 86. If the write fails, for example, by generating an exception, the task completes successfully. Otherwise, if the write is successful, a safety state may be invoked or an error reported to the user because memory lock was not in place.

The second task 172 provides a comparison at periodic intervals of the internal safety variables 76b that form neither inputs nor outputs of the standard processes 42 and 46, between primary controller 18a and partner controller 18b to check that they are in fact identical, even if the output variables may not show any deviation between the execution of the safety tasks 72a. The variables to be compared are buffered while execution of other tasks is stopped.

Referring now to FIG. 11, software scoping of variables between safety task 72b and standard tasks 72a is augmented by the architecture of the present invention. If, for example, safety tasks 72b in primary controller 18a and partner controller 18b, attempt to read or write from memory regions 82a associated with standard tasks 72a and standard variables 76a, the safety task 72b in partner controller 18b will be unable to access the address which will not exist in the partner controller 18b. This failure will either result in an exception, if an erroneous value is read, or will result in a discrepancy between the values retrieved by the tasks 72b producing an error in their ultimate outputs. If standard task information were in both of the primary controller 18a and partner controller 18b, such a failure would operate symmetrically and might not be detected.

Figure 12:
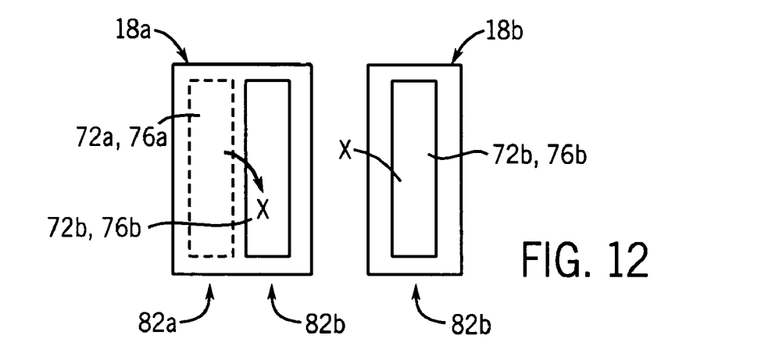
FIG. 12 is a figure similar to that of FIG. 11 showing the effect of asymmetrical loading of standard and safety program information in preventing the standard program from undetected modification of safety program information.

Referring to FIG. 12, conversely, if a standard task 72a attempts to write from memory regions 82b holding safety task 72b or safety variables 76b, it will be blocked by the MPU or if it does successfully write, it will write only to region 82b associated with primary controller 18a and not to region 82b associated with partner controller 18b. Again, this asymmetrical writing will result in a change in one of the programs 72b only that will result in a difference in the output variables compared at block 150 and 152 of FIG. 7.

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation, and maintenance of the components of the safety system, and the cooperation and training of individuals using the safety system. Although the present invention is intended to be highly reliable, all physical systems are susceptible to failure and provision must be made for such failure.

It is specifically intended that the present invention not be limited to the embodiments and illustrations contained herein, but include modified forms of those embodiments including portions of the embodiments and combinations of elements of different embodiments as come within the scope of the following claims.

We claim:

1. A safety controller comprising:
   a primary processing unit having a first processor communicating with a first memory holding a safety program requiring a first reliability of operation and a standard program requiring a second reliability of operation less than the first reliability of operation;
   a second processing unit having a second processor independent from the primary processing unit and communicating with a second memory independent from the first memory and holding the safety program and not the standard program; and
   a synchronization program executable by the primary and partner processing units to execute the standard program in the primary processing unit only and to execute the safety program in the primary and second processing units and to compare execution of the safety programs to enter a safety state when this execution differs;
   wherein the safety program and the standard program execute to generate outputs to be used to control an external device and wherein the synchronization program compares execution of the safety program by comparing outputs generated by the primary and second processing units' execution of the safety program; and
   wherein the safety program is executed repeatedly and wherein the synchronization program compares execution of the safety program at each repeated execution prior to outputting of the output values generated by the safety program to the external device.

2. The safety controller of claim 1 wherein the primary processing unit is in a first housing and the second processing unit is in a second housing independent from the first housing and further including a communications bus communicating between the first and second housings to allow intercommunication between the primary and second processing units.

3. The safety controller of claim 2 wherein the communication bus is a backplane and wherein the primary and partner processing units communicate through releasable electrical connectors on the backplane.

4. The safety controller of claim 2 wherein the communications bus is a serial communications network and wherein the primary and second processing units communicate through releasable electrical connectors on the serial network.

5. The safety controller of claim 1 wherein the primary and secondary processing units are in a single housing.

6. The safety controller of claim 1 wherein the first memory includes at least a portion that is lockable by hardware against writing.

7. The safety controller of claim 1 wherein the safety program executes to generate values of internal variables and wherein the synchronization program compares execution of the safety program by comparing values of internal variables generated by the primary and second processing units executing the safety program.

8. The safety controller of claim 1 wherein the safety program is executed repeatedly and wherein the synchronization program compares execution of the safety program at a frequency greater than the repetition frequency.

9. The safety controller of claim 1 wherein the primary processing unit includes only a single processor.

10. The safety controller of claim 1 wherein the primary processing unit includes at least two processors.

11. The safety controller of claim 10 wherein the processors of the primary processing unit share a common memory.

12. The safety controller of claim 10 wherein the processors of the primary processing unit have independent memories.

13. The safety controller of claim 10 wherein the first processor of the primary processing unit communicates with the first memory by a memory bus not directly accessible to the second processor of the partner processing unit but only accessible by the second processor through the first processor and wherein the second processor of the partner processing unit communicates with the second memory by a memory bus not directly accessible to the first processor of the primary processing unit but only accessible by the first processor through the second processor.

14. The safety controller of claim 1 wherein the primary processing unit includes a transfer program for receiving programs from a user and for loading safety programs in the first and second memory and loading standard program information only in the first memory.

15. The safety controller of claim 14 wherein the safety program holds an identification value indicating that it is a safety program.

16. The safety controller of claim 1 wherein the first memory also holds standard data used or generated by the standard program and safety data used or generated by the safety program and wherein the second memory holds the safety data used or generated by the safety program.

17. The safety controller of claim 16 wherein the second memory holds portions only of the standard data.

18. A safety controller system comprising:
a programming tenmnal executing a programming tool to:
(a) accept program instructions from a user describing a logical combination of input sensor data to produce output control data;
(b) collect the program instructions into tasks;
(c) identify the tasks as to one of a first and second level of reliability, the first level executable on a single processing unit only and the second level requiring execution in tandem on two processing units having an ability to compare execution to determine a fault in either of the two processors and to then enter a safety state; and
a safety controller having at least two independent processing units executing a stored program to receive the tasks from the programming terminal and provide both the first and second processing units with tasks identified to the second level and provide the first processing unit only the tasks identified to the first level.

19. The safety controller system of claim 18 wherein the safety controller further executes the stored program to compare execution of the tasks identified to the second level to enter a safety state when this execution differs.

20. A safety controller kit comprising:
a first controller having a first housing attachable to a backplane to communicate with other components of a control system, the first controller accepting control programs requiring a first level of reliability;
a second controller having a second housing attachable to the backplane to communicate with the first controller, the second controller accepting control programs requiring a second level of reliability greater than the first level of reliability to execute the control programs in tandem with the first controller; and
wherein the first controller further only accepts programs of the second level of reliability when the second controller is in communication with the first controller over the backplane.

21. A method of operating a safety controller having primary and partner independent processing units comprising the steps of:
(a) receiving a safety program requiring a second reliability of operation and a standard program requiring a first reliability of operation less than the second reliability of operation;
(b) loading the safety program in the primary and partner processing units and executing the safety program in tandem in the primary and partner processing unit to enter a safety state when execution differs in the primary and partner processing units; and
(c) loading the standard program in the primary processing unit only and executing the standard program;

wherein step (a) receives the standard program and the safety program at the primary processing unit only and transfers the safety program only to the partner processing unit; and
wherein the safety program holds an identification value indicating that it is a safety program and step (a) identifies the safety program to be transferred by the identification value.

22. The method of claim 21 wherein the safety program executes to generate outputs to be used to control an external device and wherein step (b) compares execution of the safety program by comparing outputs generated by the primary and partner processing unit's execution of the safety program.

23. The method of claim 22 wherein the safety program is executed repeatedly and wherein step (b) compares execution of the safety program at the conclusion of repeated executions of the safety program prior to outputting of the output values to the external device.

24. The method of claim 22 wherein the safety program executes to generate values of internal variables and wherein step (b) compares execution of the safety program by comparing values of internal variables generated by the primary and partner processing units executing the safety program.

25. The method of claim 21 wherein the safety program is executed repeatedly and wherein step (b) compares at least some of the results of the execution of the safety program at a frequency greater than the repetition frequency.

26. The method of claim 21 wherein step (b) loads some standard data used or generated by the standard program to the partner processing unit.

27. A method of operating a safety controller system comprising the steps of:
(a) accepting program instructions from a user describing the logical combination of input sensor data to produce output control data;
(b) collecting the program instructions into logical tasks;
(c) identifying the task as to one of two levels of reliability, a first level executable on a single processor and a second level requiring execution in tandem on two processors having an ability to compare execution to determine a fault in either of the two processors and to then enter a safety state;
(d) executing the tasks identified to the first level of reliability on a first processor only; and
(e) execution of the task identified to the second level of reliability on the first and a second processor in tandem to identify processor faults.

* * * * *